(12) United States Patent
Von Thal

(10) Patent No.: US 8,132,759 B2
(45) Date of Patent: Mar. 13, 2012

(54) SYSTEM AND METHOD FOR FACILITATING AERIAL REFUELING

(75) Inventor: German Von Thal, Santa Maria, CA (US)

(73) Assignee: The Boeing Company, Chicago, IL (US)

( * ) Notice: Subject to any disclaimer, the term of this patent is extended or adjusted under 35 U.S.C. 154(b) by 380 days.

(21) Appl. No.: 11/689,280

(22) Filed: Mar. 21, 2007

(65) Prior Publication Data

US 2008/0234884 A1    Sep. 25, 2008

(51) Int. Cl.
B64D 39/00    (2006.01)

(52) U.S. Cl. ................................. 244/135 A; 244/135 R

(58) Field of Classification Search ............... 244/1 TD, 244/135 A, 135 R
See application file for complete search history.

(56) References Cited

U.S. PATENT DOCUMENTS

| | | | |
|---|---|---|---|
| 3,285,544 A * | 11/1966 | Chope et al. ............ | 244/135 A |
| 3,917,196 A | 11/1975 | Pond et al. | |
| 4,025,193 A | 5/1977 | Pond et al. | |
| 4,072,283 A | 2/1978 | Weiland | |
| 4,095,761 A | 6/1978 | Anderson et al. | |
| 4,129,270 A | 12/1978 | Robinson et al. | |
| 4,158,885 A * | 6/1979 | Neuberger ................ | 701/300 |
| 4,160,534 A | 7/1979 | White | |
| 4,170,773 A | 10/1979 | Fitzsimmons et al. | |
| 4,231,536 A | 11/1980 | Ishimitsu et al. | |
| 4,257,703 A | 3/1981 | Goodrich | |
| 4,264,044 A | 4/1981 | White | |
| 4,298,176 A | 11/1981 | Kendall | |
| 4,510,525 A | 4/1985 | Kuperman et al. | |
| 4,519,560 A | 5/1985 | Ishimitsu et al. | |
| 4,586,683 A | 5/1986 | Kerker | |
| 4,633,376 A | 12/1986 | Newman | |
| 4,792,107 A | 12/1988 | Fernz et al. | |
| 4,834,531 A | 5/1989 | Ward | |
| 5,249,128 A | 9/1993 | Markandey et al. | |
| 5,267,328 A | 11/1993 | Gouge | |
| 5,479,526 A | 12/1995 | Benton et al. | |
| 5,499,784 A | 3/1996 | Crabere et al. | |
| 5,530,650 A * | 6/1996 | Biferno et al. ............. | 701/300 |
| 5,568,136 A | 10/1996 | Hochstein et al. | |

(Continued)

FOREIGN PATENT DOCUMENTS

EP    1055939    11/2000

(Continued)

*Primary Examiner* — Tien Dinh
*Assistant Examiner* — Philip J Bonzell
(74) *Attorney, Agent, or Firm* — Harness, Dickey & Pierce, P.L.C.

(57) ABSTRACT

A refueling system and method for use with a refueling tanker aircraft. The system and method involves the use of a camera system to provide imaging information concerning a receiver aircraft to the processor. The processor uses the imaging information to derive closure rate and distance information for the receiver aircraft as it approaches a refueling envelope prior to contact with a refueling boom. The processor also makes use of information from a look-up table to generate commands that are tailored to the specific type of aircraft being refueled. The commands are applied to a pilot's director lights display that generates visual commands or signals (e.g., "UP", "DOWN", "LEFT", "RIGHT") that assist the pilot of the receiver aircraft in guiding his/her aircraft toward and into the refueling envelope at a desired closure rate. The system and method eliminates potential error in the pre-contact phase of a refueling operation by eliminating judgment decisions by a boom operator when generating the commands for the pilot's director lights display.

7 Claims, 3 Drawing Sheets

U.S. PATENT DOCUMENTS

| | | | |
|---|---|---|---|
| 5,638,461 A | 6/1997 | Fridge | |
| 5,650,828 A | 7/1997 | Lee et al. | |
| 5,785,276 A | 7/1998 | Ruzicka | |
| 5,809,161 A | 9/1998 | Auty et al. | |
| 5,809,658 A | 9/1998 | Jackson et al. | |
| 5,904,729 A * | 5/1999 | Ruzicka | 701/300 |
| 5,906,336 A | 5/1999 | Eckstein | |
| 5,978,143 A | 11/1999 | Spruck et al. | |
| 5,996,939 A | 12/1999 | Higgs et al. | |
| 6,191,809 B1 | 2/2001 | Hori et al. | |
| 6,282,301 B1 | 8/2001 | Haskett | |
| 6,477,260 B1 | 11/2002 | Shimomura et al. | |
| 6,594,583 B2 | 7/2003 | Ogura et al. | |
| 6,651,933 B1 | 11/2003 | von Thal et al. | |
| 6,752,357 B2 | 6/2004 | von Thal et al. | |
| 6,768,509 B1 | 7/2004 | Bradski et al. | |
| 6,778,216 B1 | 8/2004 | Lin et al. | |
| 6,837,462 B2 | 1/2005 | von Thal et al. | |
| 6,889,941 B1 * | 5/2005 | McElreath et al. | 244/135 A |
| 6,935,595 B2 | 8/2005 | Butsch et al. | |
| 7,093,801 B2 * | 8/2006 | Schroeder | 244/135 A |
| 7,171,028 B2 | 1/2007 | von Thal et al. | |
| 7,209,161 B2 | 4/2007 | von Thal et al. | |
| 7,221,797 B2 | 5/2007 | Koshizen et al. | |
| 7,475,852 B2 * | 1/2009 | Hewitt et al. | 244/135 A |
| 2005/0269455 A1 * | 12/2005 | Hewitt et al. | 244/135 A |
| 2006/0074558 A1 * | 4/2006 | Williamson et al. | 701/213 |

FOREIGN PATENT DOCUMENTS

| | | |
|---|---|---|
| GB | 2233527 | 1/1991 |
| GB | 2300082 | 10/1996 |
| RU | 2099253 | 12/1997 |

\* cited by examiner

SYSTEM AND METHOD FOR FACILITATING AERIAL REFUELING

FIELD

The present disclosure relates to aerial refueling systems and methods, and more particularly to a system and method of guiding a fuel receiving aircraft into a predetermined spatial envelope behind a refueling tanker aircraft through the use of visual display signals presented to a pilot of the fuel receiving aircraft.

BACKGROUND

The statements in this section merely provide background information related to the present disclosure and may not constitute prior art.

Aerial refueling tanker aircraft may be equipped with a "pilot's director light" system. The function of this system is to enable the air refueling boom operator (i.e., typically known as the "Boomer") to provide visual commands to the receiver aircraft pilot during a pre-contact phase of alignment between the refueling tanker aircraft and the fuel receiving aircraft (the "receiver" aircraft). The pilot's director light system displays commands to the pilot of the receiver aircraft (e.g., "fast", "slow", "up", "down", "left", "right") that helps the pilot of the receiver aircraft to guide his/her aircraft into a predetermined spatial refueling envelope behind the refueling aircraft where contact with a refueling boom can be made. These commands from the pilot's director light system may also complemented by voice communications from the boom operator (except where a radio silence condition is required).

The boom operator uses judgmental distance and the closure rate between the receiver fuel receptacle on the receiver aircraft and the boom tip for providing the commands to the pilot's director light system. The closure rate is the rate that the receiver aircraft moves toward and into the predetermined refueling envelope. When the receiver aircraft is within the refueling envelope, the pilot of the receiver aircraft steadies his/her aircraft so that the boom hook-up begins and fuel is delivered. If the boom operator determines the receiver aircraft is not moving into the refueling envelope properly during this pre-contact phase of alignment, he/she may give a "break-away" command to abort the operation. In this instance, the pilot of the receiver aircraft will then need to break-away from the refueling aircraft and then repeat the approach in an effort to enter the spatial refueling envelope at a suitable approach angle and suitable closure rate.

As will be appreciated, the experience and judgment of the boom operator plays a significant role in providing the commands to the pilot's director light system that enables the pre-contact phase of receiver aircraft positioning, and thus the overall refueling operation, to be successfully carried out. Misjudgment or human error (position, closure rate, command errors, etc.), may necessitate repeated attempts before the receiver aircraft is properly guided into the spatial refueling envelope where contact with the boom tip can be made. The time needed to perform repeated refueling attempts can potentially adversely impact a mission.

SUMMARY

The present system and method is directed to an aerial refueling system and method for assisting in guiding a fuel receiving aircraft into a refueling envelope behind a refueling aircraft. In one embodiment, the system includes a subsystem associated with the re-fueling aircraft for real time monitoring of a position of the receiver aircraft, relative to the refueling aircraft. The subsystem generates signals representing needed flight adjustments by the receiving aircraft as the receiving aircraft approaches and enters the spatial envelope. A visual indicator system is responsive to the signals from the subsystem and generates visually perceptible information that an operator of the receiving aircraft can see to assist the operator in guiding the receiving aircraft towards and into the refueling envelope.

In one embodiment the visual indicator system includes a pilot's director lights system that is carried on the refueling aircraft, and the subsystem includes a camera system for real time imaging of the receiver aircraft. The output of the camera system is fed into a processor that uses the imaging information, and also information on the specific type of aircraft being refueled, to generate the signals that drive the pilot's director lights system.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, its application or uses.

Figure 1:
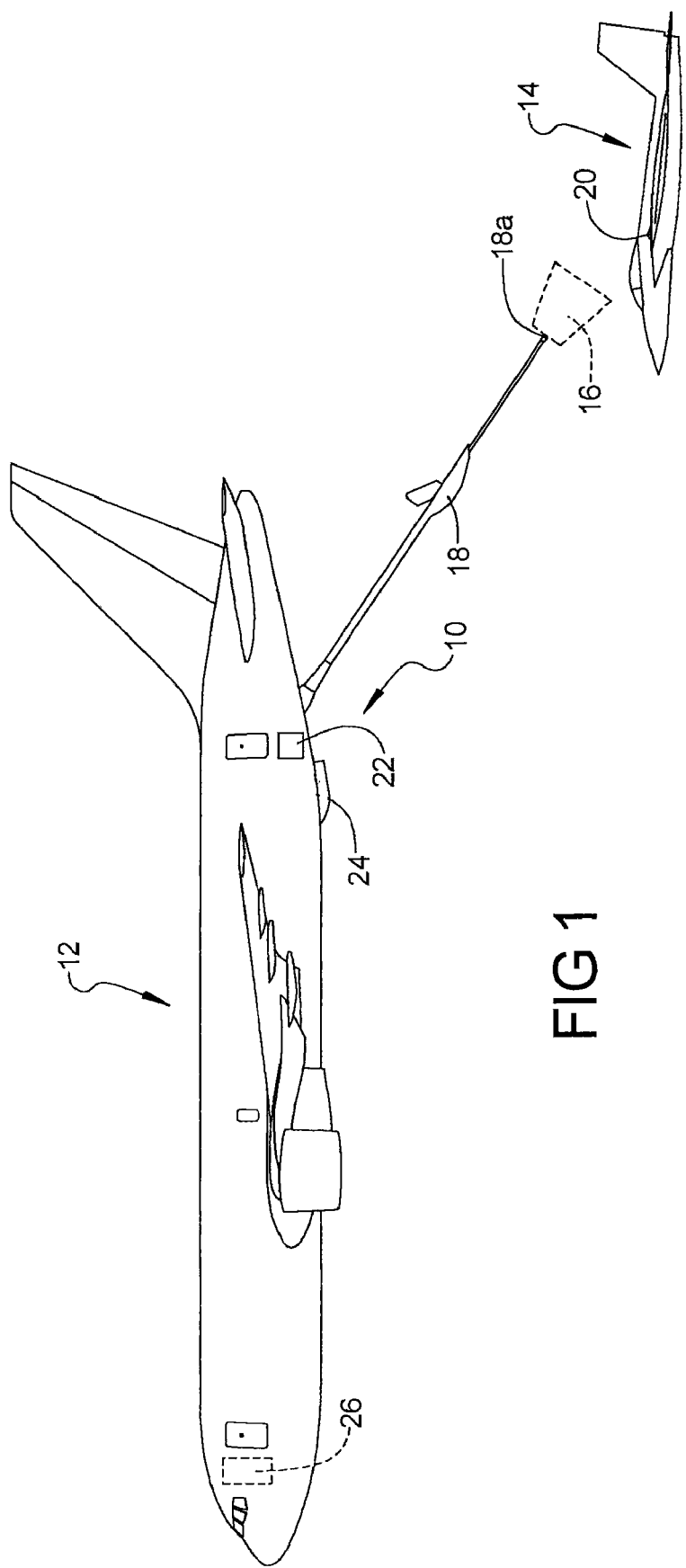
FIG. 1 is a simplified illustration of a refueling taker aircraft, a receiver aircraft, and spatial refueling envelope that the boom operator guides the receiving aircraft into, and where the refueling aircraft includes an embodiment of the present system for assisting in guiding the receiver aircraft into the refueling envelope.

Referring to FIG. 1, there is shown an environmental view of a tanker refueling aircraft 12 that carries a system 10 in accordance with one embodiment of the present disclosure for assisting in performing an aerial refueling operation. More, specifically, the system 10 is used to help guide a fuel receiving aircraft (hereinafter "receiver aircraft") 14 into a spatial refueling envelope 16 behind and slightly below the refueling aircraft 12. A boom 18 controlled by a boom operator on the refueling aircraft 12 can then be extended into a refueling receptacle 20 on the receiver aircraft 14. An aerial refueling operation can be carried out between the refueling aircraft and the receiver aircraft 14.

The system 10, in this embodiment, includes one or more cameras 22 located at an aft end of the refueling aircraft 12 that can be used to image the receiver aircraft 14 as the receiver aircraft 14 approaches the refueling envelope 16. A pilot's director lights display 24 is also located on an exterior surface of the fuselage of the refueling aircraft 12 so that it can be viewed by a pilot of the receiver aircraft 14 as the pilot guides the receiver aircraft 14 towards and into the refueling envelope 16. It is important that the receiver aircraft 14 approach and enter the refueling envelope 16 at a suitable predetermined rate of speed, typically termed a "closure rate". The system 10 enables information concerning the type of receiver aircraft and a suitable closure rate for the receiver aircraft to be used to generate command signals that can be used to illuminate the pilot's director lights display 24. The commands may include, for example, "FAST", "SLOW", "UP", "DOWN", "LEFT", "RIGHT", "BREAK AWAY", etc. that visually cue the pilot in to needed adjustments in the approach and/or closure rate of the receiver aircraft 14 as it enters the refueling envelope 16. The system 10 eliminates judgment errors by the boom operator located in an operator station 26 on the refueling aircraft 12 that may complicate the hook up process between the boom tip 18a of the boom 18 and the refueling receptacle 20 of the receiver aircraft 14. The system 10 thus enables known characteristics of the receiver aircraft 14, in addition to real time imaging information provided by the camera (or cameras) 22, to be used to generate the commands that drive the pilot's director lights display 24, thus removing any possible error by the boom operator in judging the distance, closure rate or position of the receiver aircraft 14.

Figure 2:
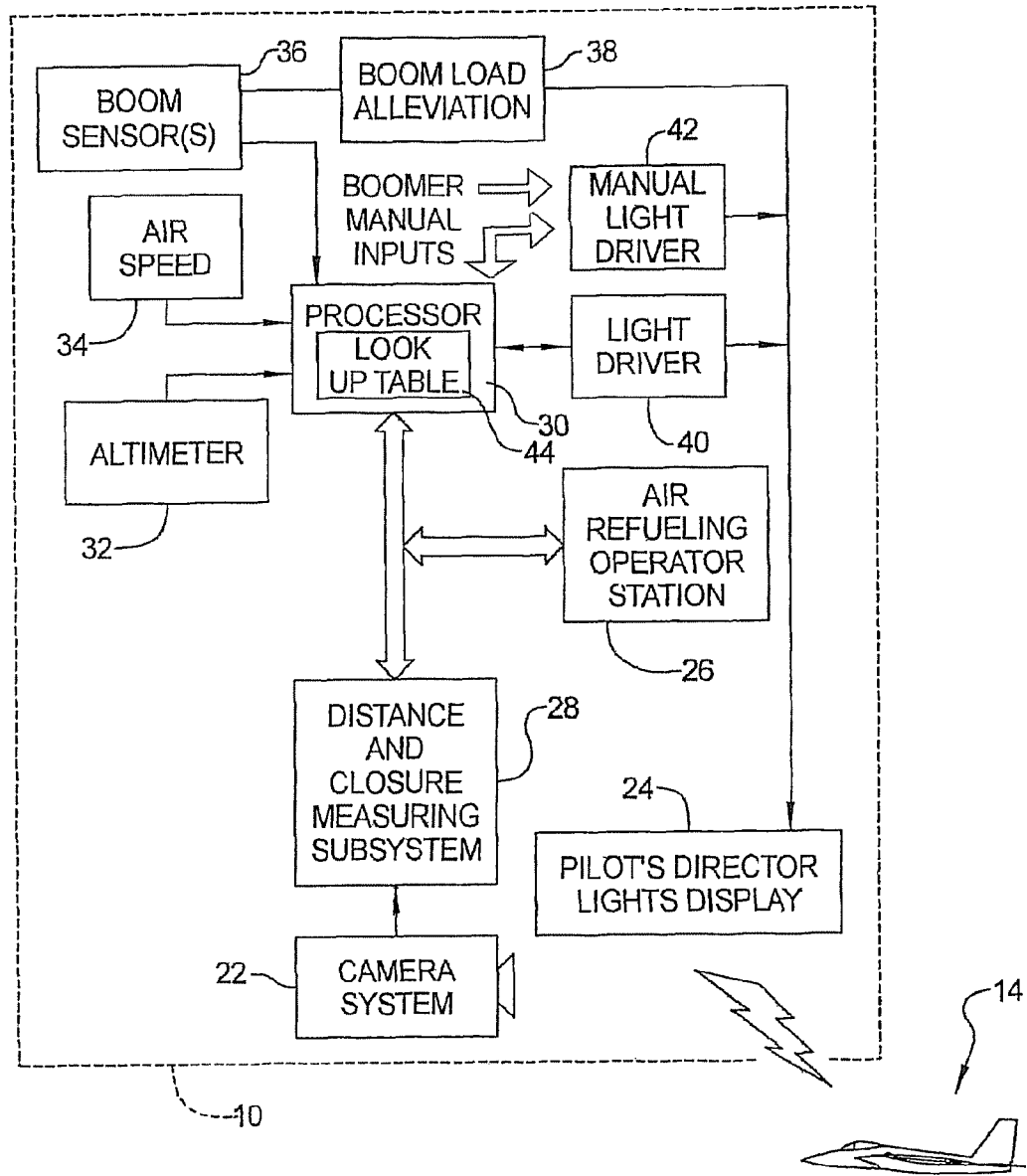
FIG. 2 is a block diagram of one embodiment of the system of the present disclosure.

Referring to FIG. 2, a simplified block diagram of one embodiment of the system 10 as illustrated. It will be appreciated that the system 10 is carried on the refueling aircraft 12, even though the refueling aircraft 12 is not illustrated diagrammatically on FIG. 2. The system 10 may include the camera system 22 which may comprise one or more cameras for imaging the receiver aircraft 14. The camera system 22 provides electrical signals that are fed into a distance and closure measuring subsystem 28. The distance and closure measuring subsystem 28 may include a suitable distance and closure rate algorithm for providing distance and closure rate signals to a processor 30. One suitable distance and closure rate system algorithm is disclosed in U.S. Pat. No. 6,752,357, assigned to The Boeing Company, hereby incorporated by reference into the present application. It will be appreciated, however, that any suitable subsystem or mechanism for providing signals relating to the distance and closure rate of the receiver aircraft 14 could be incorporated for use with the present system 10.

With further reference to FIG. 2, the distance and closure measuring subsystem 28 provides signals to the operator station 26 of the refueling aircraft 12 and also to the processor 30. This enables the operator to visually monitor the signals being generated by the distance and closure measuring subsystem 28, in the event the operator wishes or needs to take over manual control of the boom 18. Additional information may optionally be obtained from an altimeter 32 and/or an airspeed sensor 34 of the refueling aircraft 12, and outputs from such sensors also fed to the processor 30. Sensors associated with the boom 18, as designated by box 36, may be used to control a boom load alleviation subsystem 38. The boom load alleviation subsystem 38 assists in alleviating a load experienced by the boom 18 to thus make the boom 18 essentially weightless as it is coupled to the receptacle 20 of the receiver aircraft 14.

With further reference to FIG. 2, the processor 30 uses the above-described inputs to generate command signals to a light driver subsystem 40. The light driver subsystem 40 generates signals to the pilot's director lights display 24. The output signals from the light driver subsystem 40 enable the pilot's director lights display 24 to be illuminated with the various above-described signals or commands that the pilot of the receiver aircraft 14 can use to guide the aircraft 14 into the refueling envelope 16 at a desired closure rate. Optionally, the boom operator can apply inputs to a manual light driver subsystem 42 to manually produce commands on the pilot's director lights display 24 if needed. Thus, the system 10, in this embodiment, enables the processor 30 to control the generation of command signals for providing the commands to the pilot's director lights display 24 or, alternatively, the boom operator can be provided with this capability, via the processor 30, based on his/her visual observation of the receiver aircraft 14 as it approaches the refueling envelope 16. It will be appreciated that the system 10 could also be applied to a probe/drogue refueling device in which the receiver aircraft 14 includes a probe that engages with a drogue at a distal end of a flexible refueling hose. Such a system is well known in the art and will not be described in detail here.

In one embodiment, the system 10 may make use of a look-up table 44 that includes specific information about the type of receiver aircraft and the desired closure rate for the particular type of receiver aircraft that is being refueled. It will be appreciated that different types of aircraft have different optimal closure rates when approaching the refueling envelope 16 shown in FIG. 1. Thus, the processor 30 accesses the look-up table 44 and uses the information pertinent to the specific type of aircraft being refueled, when generating the commands used to drive the pilot's director lights display 24.

Figure 3:
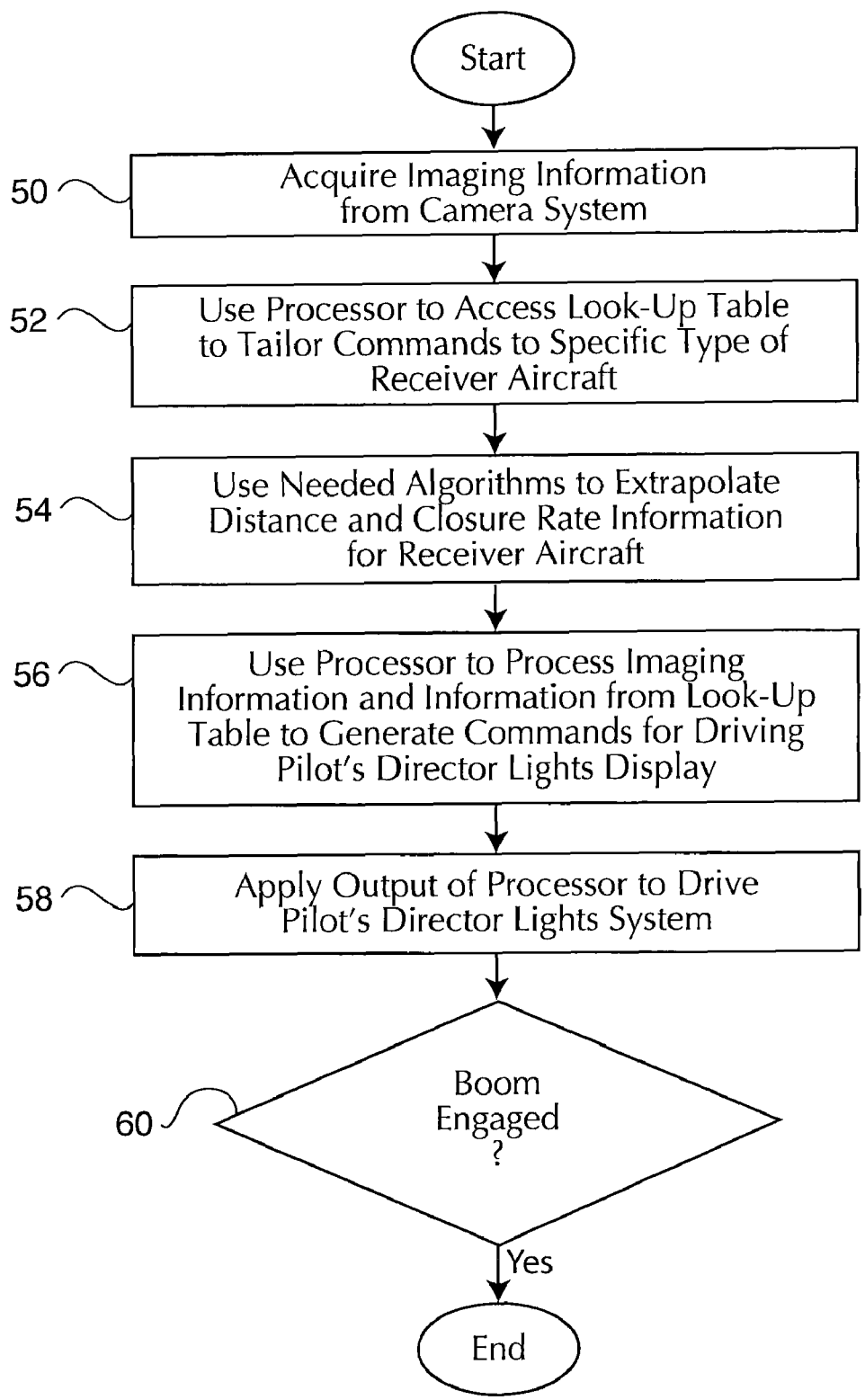
FIG. 3 is a flowchart illustrating an exemplary series of operations that may be performed by the system of FIG. 2 during a pre-contact phase of an aerial refueling operation.

Referring to FIG. 3, a flowchart illustrating a plurality of operations that may be performed by the system 10 will now be described. At operation 50, real time imaging information concerning the receiver aircraft 14 is obtained from the camera system 22. At operation 52, the processor 30 accesses the look-up table 44 to retrieve specific distance and closure rate information for the specific type of aircraft being refueled. At operation 54, the needed algorithms to extrapolate distance and closure rate information from the output signals of the camera system 22 are executed. This provides electrical signals that represent distance and closure rate information for the specific type of receiver aircraft that is being refueled. At operation 56, the processor 30 uses the information from the distance and closure measuring subsystem 28, as well as the look-up table 44, to generate commands for driving the pilot's director lights display 24. At operation 58, the output of the processor 30 is applied to an input of the pilot's director lights display 24 to generate the needed commands (e.g., "FAST", "SLOW", "UP", "DOWN", "LEFT", "RIGHT", "BREAK AWAY"). At operation 60, the processor 30 makes a determination if the boom 18 has engaged the receiver aircraft 14 after the receiver aircraft has moved into the refueling envelope 16. If so, the system 10 refueling operation is complete, and the processor 30 terminates the commands to the pilot's director lights display 24. If the answer to this inquiry is "No", further information is acquired from the camera system 22 and operations 52-60 are repeated. It will be appreciated that operations 50-60 are performed in real time. Thus, the system 10 is able to provide virtually instantaneous signals to the pilot of the receiver aircraft 14 via the pilot's director lights display 24 to assist the pilot of the receiver aircraft 14 in guiding the receiving aircraft 14 into contact with the tip 18a of the refueling boom 18.

The system 10 thus eliminates any potential error that could be introduced by the boom operator as a result of misjudgment by the boom operator as to the distance, position or closure rate of the receiver aircraft 14 as the receiver aircraft 14 approaches the boom envelope 16. This allows refueling to be accomplished quickly and efficiently, which helps to insure that the mission being performed by the receiver aircraft 14 is not compromised because of difficulty encountered during a refueling operation. The system of the present application can be implemented with a limited number of additional component subsystems and also makes use of preexisting components on a typical refueling tanker aircraft (i.e., the camera system and a pilot's director lights display).

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A system for use with a tanker refueling aircraft to assist in guiding a fuel receiver aircraft into a desired spatial envelope, within which a refueling component can be coupled to said receiver aircraft to enable a refueling operation to be carried out on said receiver aircraft, the system comprising:
   an operator station having a display system;
   a processor in communication with said operator station;
   a camera system in communication with said processor for providing a real time image of said receiver aircraft that is displayed on said display system of said operator station;
   a closure rate and distance measuring subsystem in communication with the processor and said operator station, and further being disposed on said re-fueling aircraft for real time monitoring of a position of said receiver aircraft, relative to said refueling aircraft, and a closure rate of said receiver aircraft relative to said refueling aircraft, and generating signals used by said processor in generating required flight adjustments by said receiver aircraft as said receiver aircraft approaches and enters said spatial envelope, said signals being generated without input from a boom operator on the refueling aircraft;
   the processor further being in communication with a look-up table for storing information pertinent to a plurality of different types of aircraft that may be involved in a refueling operation performed by said refueling aircraft, and information concerning a predetermined closure rate required for use with each one of said different types of aircraft, and the processor further being adapted to modify said signals in accordance with a specific said closure rate, associated with the receiver aircraft, obtained from the look-up table;
   a visual indicator system that is responsive to said signals for generating visually perceptible information that an operator of said receiver aircraft can see to assist said operator in guiding said receiver aircraft towards and into said spatial envelope; and
   a manual light driver system also in communication with the processor and adapted to receive an input from the boom operator via the operator station to allow the boom operator to directly drive the visual indicator system in place of the subsystem, so that the boom operator has direct control over the visually perceptible information being generated by the visual indicator system that the operator of the receiver aircraft sees.

2. The system of claim 1, wherein said visual indicator system is carried on said refueling aircraft.

3. The system of claim 1, wherein said camera system includes a camera carried on said refueling aircraft for real time monitoring of a position of said receiver aircraft relative to said refueling aircraft.

4. The system of claim 1, further comprising a driver circuit for generating said signals from an output of said processor.

5. The system of claim 1, wherein said visual indicator system displays at least one of the following commands to a pilot of said receiving aircraft
   a "Fast" command indicating a need to increase air speed;
   a "Slow" command indicating a need to decrease air speed;
   a "UP" command indicating a need to increase altitude;
   a "Down" command indicating a need to decrease altitude;
   a "Left" command indicating a need to move to the left;
   a "Right" command indicating a need to move to the right; and
   a "Breakaway" command indicating a need to abort the approach into said spatial envelope.

6. The system of claim 1, wherein said processor makes use of information from at least one of an altimeter and an airspeed indicator of said refueling aircraft.

7. A system for use with a tanker refueling aircraft to assist in guiding a fuel receiver aircraft into a desired spatial envelope, within which a refueling component can be coupled to said receiver aircraft to enable a refueling operation to be carried out on said receiver aircraft, the system comprising:
   an operator station having a display system;
   a processor in communication with said operator station;
   a camera system in communication with said processor for providing a real time image of said receiver aircraft that is displayed on said display system of said operator station;
   a closure rate and distance measuring subsystem in communication with the processor and said operator station, and further being disposed on said re-fueling aircraft for real time monitoring of a position of said receiver aircraft, relative to said refueling aircraft, and a closure rate of said receiver aircraft relative to said refueling aircraft, and generating signals used by said processor in generating required flight adjustments by said receiver aircraft as said receiver aircraft approaches and enters said spatial envelope, said signals being generated without input from a boom operator on the refueling aircraft;
   the processor being in communication with a look-up table for storing information pertinent to a plurality of different types of aircraft that may be involved in a refueling operation performed by said refueling aircraft, and information concerning a specific, predetermined closure rate for each one of said different types of aircraft, and said processor further using a selected one of said closure rates obtained from said look-up table to modify said signals as needed for the receiver aircraft;
   an altimeter in communication with said processor for providing a signal representative of a real time altitude of said refueling aircraft;
   an air speed indicator in communication with said processor for providing an airspeed signal to the refueling aircraft;
   a visual indicator system that is responsive to said signals for generating visually perceptible information that an operator of said receiver aircraft can see to assist said operator in guiding said receiver aircraft towards and into said spatial envelope; and
   a manual light driver system also in communication with the processor and adapted to receive an input from a boom operator via the operator station to allow the boom operator to directly drive the visual indicator system in place of the subsystem, so that the boom operator has direct control over the visually perceptible information being generated by the visual indicator system that the operator of the receiver aircraft sees.

* * * * *